Patented May 21, 1940

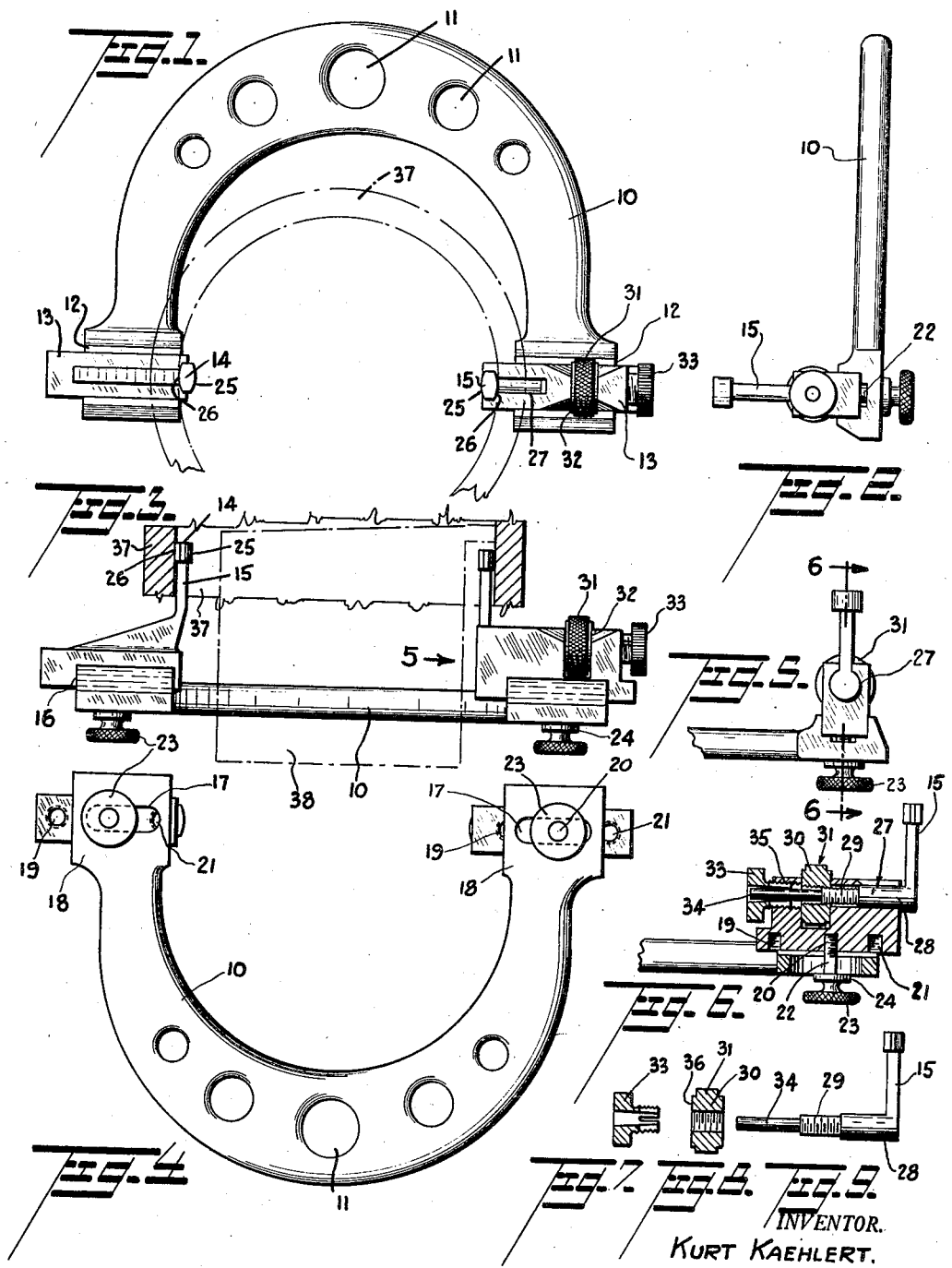

2,201,832

UNITED STATES PATENT OFFICE 2,201,832

CALIPER GAUGE

Kurt Kaehlert, New York, N. Y.

Application August 18, 1938, Serial No. 225,633

2 Claims. (Cl. 33—163)

This invention relates to caliper gauges and more particularly to a caliper gauge for obtaining measurements of the diameter of different size bores.

It is an object of the present invention to provide a very simple, inexpensive, efficient and economical device of the above nature for facilitating test readings of diameters of bores, even during boring operation and without being forced to displace the boring bar or the like and the work piece.

Another object of this invention resides in the provision of a substantially U-shaped frame, and reversible measuring means provided at the ends thereof, said means including jaws having their opposite contact faces arcuated so as to enable the workman to perform measurement of diameters within relatively large limits.

Still another object of the present invention contemplates the adjustment of said measuring means and to micrometrically adjust the relation of said jaws with each other.

A further object of the invention is to provide the ends of said frame with slideways for adjustably guiding said measuring means substantially therein.

Still a further object of the invention is to provide interchangeable means at said ends for enabling said means to be used in frames or bow-like holders of different dimensions.

A still further object of the present invention resides in the provision of a substantially U-shaped caliper gauge, particularly adapted for measuring bores and having free ends, measuring means being adjustably provided at said ends, the said means including contact faces arranged angularly out of the plane of the body of the gauge for facilitating measurements of bores.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, a drawing depicting certain forms of the invention has been annexed as a part of this disclosure, and in such drawing, like characters of reference denote corresponding parts throughout all of the views, of which—

Fig. 1 is a front elevational view of the caliper gauge showing the same during measuring operation.

Fig. 2 is a side elevational view of the device.

Fig. 3 is a side elevational view of the device during measuring operation as shown in Fig. 1.

Fig. 4 is a rear elevational view of the embodiment of the device as shown in Fig. 1.

Fig. 5 is a fragmentary elevational view of the device looking in the direction of the arrow (Fig. 3).

Fig. 6 is a partial sectional view of the part shown in Fig. 5, along line 6—6.

Figs. 7 to 9 are some of the parts employed in Fig. 6, Figs. 7 and 8 being shown in section.

Referring now to the drawing and more particularly to Fig. 1, there is shown one of the numerous possible embodiments of the invention, which comprises the substantially U-shaped or bow-shaped frame 10, having a plurality of apertures 11 for facilitating the gripping action of the hand of the operator, the slideways 12 provided at the ends of said frame 10, and the slides or shoes 13 movable in said slideways with its respective measuring jaws 14 and 15. Of course, it is understood that these parts are to be made of any material suitable for the purposes for which the caliper gauge is used. Such material may be metal, or any formable material or composition.

The slideways 12, which are at the free ends of the frame 10, are provided with the channels 16 having therein the elongated slots 17 communicating with the opposite faces 18 of the slideways 12.

Slidably arranged within each channel 16 is the shoe 13, the base of which is provided with threaded openings 19, 20, 21 for receiving a shank 22 of the adjusting set-screw 23, the latter having an increased or flanged portion 24 for bearing against the face 18, by which the shoe 13 is set in position after adjustment is made, the shank 22 projecting through said slot 17.

The shoes 13 are provided with the extending jaws 14, 15, one of which is arranged for sliding relation with its respective shoe, as hereinafter explained.

Each jaw is preferably provided at its upper end with contact faces 25, 26 substantially elliptical or arcuate in section. At least one of said shoes 13 is provided with the channel or recess 27 which slidably receives therein the shaft 28 of the jaw 15. Shaft 28 comprises the threaded portion 29 for threadedly receiving a screw 30 having a frictional circumferential portion 31 for engagement with the fingers of a hand. The portion 31 is rotatably set in a slot 32 formed within shoe 13. A lock nut 33 slidably fits over the projecting end portion 34 of shaft 28 and threadedly engages the opening 35 which communicates with the channel 27. This nut 33 is adapted to bear against the face 36 of said set screw 30 to lockingly engage therewith for holding the same in the desired adjusted position.

In practically applying the novel caliper gauge for the purpose of measuring the internal diameter or bore of the tube 37 the slides or shoes 13 supporting the measuring jaws 14, 15 are placed in desired position on the slideways 12. To this end, the shank 22 of each set screw 23 is made to threadedly engage a selected threaded hole 19 or 20 or 21, which holes are provided in the base of the shoes 13.

By adjusting said shoes with respect to the slideways 12, the relation between the curved faces 26, 26 of jaws 14, 15 (carried by and angularly extending from the shoes) will thus be roughly fixed and consequently approximately adapted to the bore of the tube 37, as shown in Fig. 1.

Now, by manipulating set screw 30 jaw 15 may be further regulated and micrometrically adjusted, which together with the other jaw 14 will correctly span the diameter of the bore. Lock nut 33 is then manipulated to fix this adjusted position of screw 30 by the frictional engagement of nut 33 with face 36 of screw 30.

Operation and adjustment of the caliper gauge may be performed even during the operation of the boring mill, and while the boring bar 38 and work piece 37 remain in place.

After correct measurement of diameter is taken the distance from face 26 of jaw 14 to face 26 of jaw 15 may be then measured by any suitable device, such as a micrometer and the like.

It is to be noted that the jaws 14, 15 may be provided at one of the ends of a respective shoe 13. By detaching said shoes from the slideways 12 and reversing said shoes further adjustments may be obtained within a large range.

Many changes may be had in order to adapt the caliper gauge for various purposes since the same may be used in connection with the measurements of outside and inside diameters of work pieces and the like. To this end, both jaws 14 and 15 may be made movable on said shoes 13 although only one movable jaw 15 has been shown in the drawing.

The shoes 13 are adapted to be employed with different sizes and shapes of frames enabling a diversity of measurements being made. The latter may also be accomplished because of the reversibility of the shoes. As an example, it is possible in a single frame to obtain a range of between 1.5 inches to 6 inches by virtue of the adjustments provided due to the plurality of holes 19, 20, 21 and the reversibility of the shoes with its jaws, each arranged at one end thereof.

From the foregoing description, taken in connection with the accompanying drawing, the advantage of the construction and operation of the device shown will be readily understood by those skilled in the art to which the invention pertains; and while I have described the principle of operation, together with the device which I now consider to be the best embodiment thereof, I desire to have it understood that the device shown is merely illustrative and that such changes may be made as are within the scope of the appended claims.

Having thus described the invention what is claimed as new and desired to be secured by Letters Patent is:

1. A device of the character described comprising a substantially U-shaped frame having aligned slideways at its ends, interchangeable slidable shoes guided in said slideways, respectively, each shoe having at its underface a plurality of threaded perforations, each slideway being provided with a longitudinal slot adjacent said perforations of said shoes, means protruding through said slots, respectively, and threadedly engageable selectively with said perforations to adjust said shoes relatively to each other, a jaw projecting from the end of each shoe substantially at a right angle with respect to the plane of sliding movement of said shoes, contact faces substantially elliptical in contour at the ends of each jaw, and a shaft connected with one of said jaws and journaled in its respective shoe, said shaft having a threaded portion for engagement with a set screw to adjust said one jaw relatively to its respective shoe and the other of said jaws, whereby said adjustable jaw may be displaced relatively to the respective shoe and to the other of said jaws to facilitate measurement of inner or outer diameters.

2. A device of the character described comprising a substantially U-shaped frame having aligned slideways at its ends, interchangeable slidable shoes guided in said slideways, respectively, each shoe having at its underface a plurality of threaded perforations, each slideway being provided with a longitudinal slot adjacent said perforations of said shoes, means protruding through said slots, respectively, and threadedly engageable selectively with said perforations to adjust said shoes relatively to each other, a jaw projecting from the end of each shoe substantially at a right angle with respect to the plane of sliding movement of said shoes, contact faces substantially elliptical in contour at the ends of each jaw, at least one of said jaws being slidably and adjustably journaled in its respective shoe, whereby said one jaw may be displaced relatively to said respective shoe and to the other of said jaws to facilitate measurement of inner and outer diameters.

KURT KAEHLERT.